Oct. 16, 1934.  G. A. METHE  1,977,237
ELECTRIC GRILL
Filed March 23, 1931
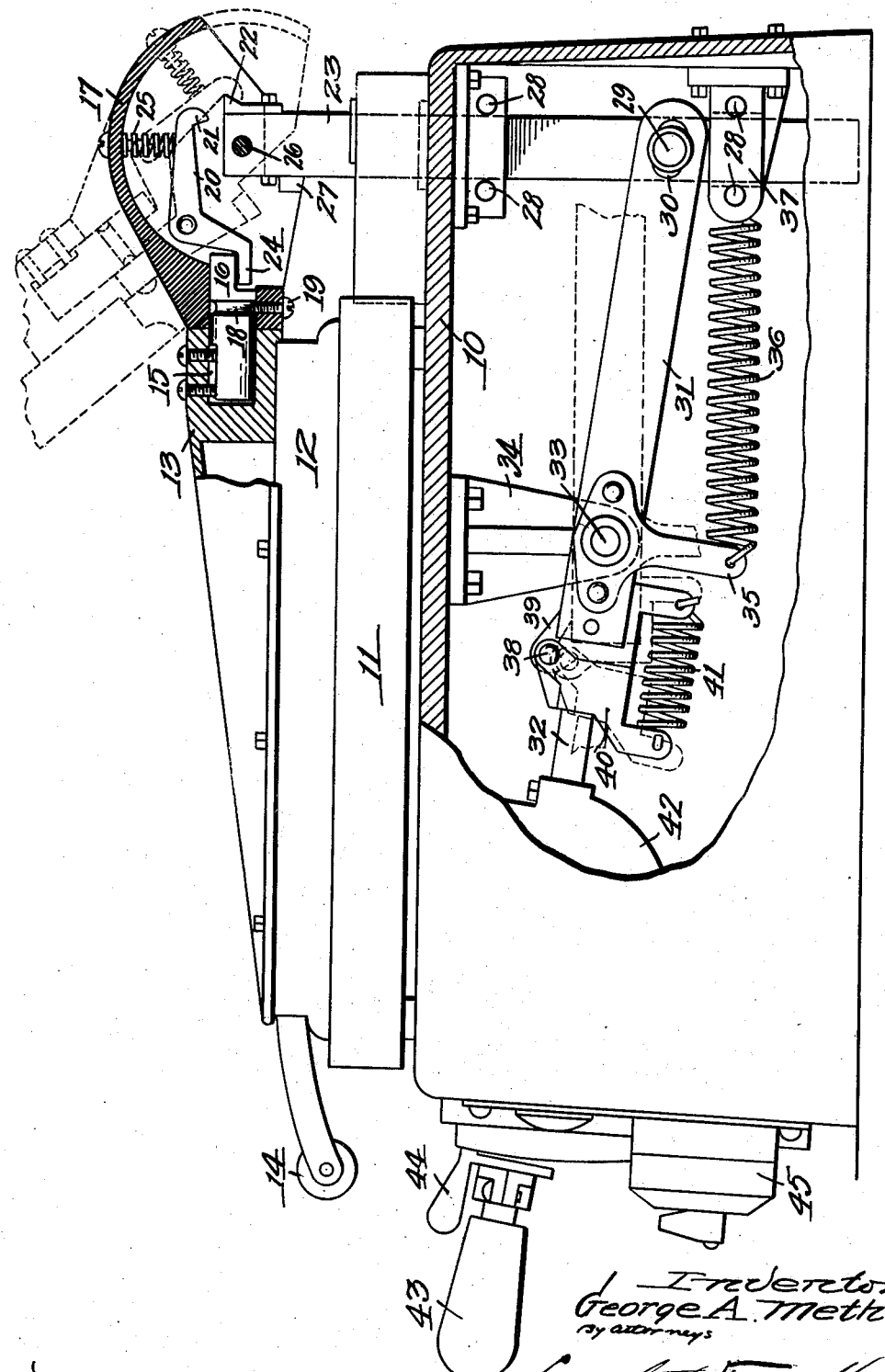
Inventor
George A. Methe Patented Oct. 16, 1934

1,977,237

UNITED STATES PATENT OFFICE 1,977,237

ELECTRIC GRILL

George A. Methe, Leominster, Mass.

Application March 23, 1931, Serial No. 524,431

5 Claims. (Cl. 53—5)

This invention relates to a grill for cooking meats and other substances, and the same principle can be used in a toaster or other article of the same general nature.

The principal object of the invention is to provide simple and effective means, actuated by a handle on the upper element, by which the latch which holds it up in inclined position can be released so that it can be turned down again to parallel position.

Other objects and advantages of the invention will appear hereinafter.

Reference is to be had to the accompanying drawing in which the figure is a longitudinal vertical sectional view of an electric grill constructed in accordance with this invention and shown partially in section.

The grill is shown as comprising a hollow casing 10, on the top of which is a lower element 11 of the grill, having of course an electric heating unit therein, not shown. This element is fixed in stationary horizontal position on the casing. Above it is a movable electric unit and grill element 12, and between these two elements the steak or other material to be cooked is placed.

The upper element 12 is fixed to a frame 13 above it and is provided with a handle 14 for manipulating it. In the end of this frame is a cylindrical socket 15 open at the rear end in which is located a cam 16. This cam is held in the frame 13 by screws or the like and has a cylindrical portion which enters a perforation of the same shape in a cap 17. The cam member is provided with a circumferential groove 18 into which extends the end of a screw 19 to hold the cam longitudinally but to allow it to rotate or oscillate with respect to the cap. The cam end of this cam 16 is at the right of the drawing and is of semi-cylindrical shape.

In the cap is a lever 20 which has a latch 21 for engaging a stationary projection 22 on a rod 23, and it has a cam operated end 24 normally resting under the cam 16. A spring 25 normally holds this latch down in latched position if the cam is not in a position to actuate it. In the position shown it is forced down as far as it can be. When the handle 14 is raised, it swings the whole structure consisting of the parts 12 and 17 about a pivot 26 on the top rod 23 and the latch 21 will come down and latch under the projection 22, the spring yielding to allow this action. This will hold the element 12 in inclined position. When it is desired to restore the element 12 to horizontal position the handle 14 is turned on the axis of the cam member 16 and this cam will force the end 24 downwardly and swing the end 21 upwardly away from the projection 22 and release these parts. The cap 17 has a stop lug 27 adapted to engage the rod 23 to hold the upper unit in horizontal position.

The rod 23 is mounted between freely rotating rolls 28 located in pairs on both sides of it so that it will have a perfectly parallel vertical motion. It is provided with a stud 29 which engages in a slot 30 in an arm 31 which, together with another arm 32 constitutes a lever. This arm 31 is pivoted on a stud 33 on a bracket 34 fixed on the inside of the casing. Also pivoted or otherwise secured to the arm 31 is an arm 35 connected by a strong spring 36 with a stationary bracket 37 which also supports two of the rolls 28.

The two arms 31 and 32 are pivoted together by a stud 38 which is located out of and above the central line of these two arms when they are located in alignment with each other. This stud is mounted in two brackets 39 and 40, one secured to the arm 31 and the other secured to the arm 32. These two brackets have projections extending therefrom on opposite sides of the combined lever 31 and 32 and a spring 41 connecting them. The two springs 36 and 41 are coiled extension springs. On the arm 32 is a solid weight 42 and the arm extends through the casing and is provided with a handle 43 for operating it and a latch 44 for holding it in its uppermost position.

An electric switch 45 is used to turn the current on and off but as this invention involves no improvement or change in the electric wiring, the same is not shown herein.

The operation of the parts of the device shown in the casing is comparatively simple. As illustrated, the two arms 31 and 32 constitute a lever pivoted at 33 and having a counterweight 42 for partially counterbalancing the weight of the electric unit 12 and a counterweight spring 36 acting on the lever in the same direction as the weight.

It will be seen that when the latch 44 is released and the parts are left free the upper electrical unit 12 will press down on the meat or other material on the unit 11 but not with the force of all its weight. The reason for having two counterweights is that it is desired at times to relieve the element 12 of a part of the counterweighting force but not all of it. This is accomplished through the joint 38, 39, 40 and spring 41. When the movable parts are elevated to a greater or less degree the arm 32 is turned on the pivot 38. The weight 42 no longer acts as a counterweight and then only the spring 36 will so act. Under these circumstances the weight of the unit 12 presses down with greater force than it does when the parts are in the position shown in full lines.

In this way it will be seen that the grill is provided which has two counterbalancing devices, one of which can be thrown out of operation when a greater force is required on the material being cooked. Furthermore the upper electrical unit is connected with the bottom in such a way that it will rise and fall in exactly a vertical manner and will always remain absolutely parallel with the stationary unit below. The manner of lifting the upper unit 12 about its pivot 26 holding it elevated in inclined position and releasing it contributes to the convenience and usefulness of the device.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. In an electric grill, the combination with a fixed lower unit and a movable upper unit, of means for raising and lowering the upper unit and retaining it at all times parallel with the lower unit when it is in operative position, said means comprising a vertical reciprocable rod having a projection thereon, said upper unit being pivoted to said rod, a lever movable with the upper unit and having a latch end pivotally mounted with respect to the upper unit, a spring for holding said lever down at its latch end to engage said projection when the upper unit is turned upwardly on its pivot and hold it in inclined position until the catch is released, said upper unit being pivoted to turn on a longitudinal axis, and means for releasing the latch by the turning of the upper unit on its longitudinal axis.

2. In an electric grill, the combination with a stationary unit and a movable unit, of a movable rod having a pivot, a cap pivotally mounted on the pivot, a projection on the rod, a lever pivoted on the cap and having a latch end for engaging said projection when the head is turned into inclined position to hold it there, and a stud carried by said head, fixed to said movable unit and adapted to be turned in the cap, said stud having a cam end thereon adapted to engage the end of said lever to swing the lever on its axis when the upper unit is turned on the axis of the stud, thereby releasing the lever from the said projection.

3. In an electric grill, the combination with a fixed lower unit, a projection, and a pivoted upper unit, of a lever movable with the upper unit and having a latch end pivotally mounted with respect to the upper unit, a spring for holding said lever down at its latch end to engage said projection when the upper unit is turned upwardly on its pivot and hold it in inclined position until the catch is released, said upper unit being pivoted to turn on a longitudinal axis, and means for releasing the latch by the turning of the upper unit on its longitudinal axis.

4. In an electric grill, the combination with a fixed lower unit, a projection, and a pivoted upper unit, of a lever movable with the upper unit and having a latch end pivotally mounted with respect to the upper unit to engage said projection, said upper unit being pivoted to turn on a longitudinal axis, and means for releasing the latch by the turning of the upper unit on its longitudinal axis.

5. In an electric grill, the combination with a stationary unit and a movable unit pivoted to turn on a longitudinal axis, of a horizontal pivot, a cap pivotally mounted on the pivot, a projection, a lever pivoted on the cap and having a latch end for engaging said projection when the cap is turned into inclined position to hold it there, and a cam on the movable unit in position to engage the end of said lever to swing the lever on its axis when the upper unit is turned on a longitudinal axis, thereby releasing the lever from the said projection.

GEORGE A. METHE.